United States Patent

Worley

[15] 3,683,398

[45] Aug. 8, 1972

[54] SEISMIC DATA TIME VARYING TIME SCALE DISPLAY AND PROCESS

[72] Inventor: John K. Worley, Houston, Tex.

[73] Assignee: Mandrel Industries, Inc., Houston, Tex.

[22] Filed: Sept. 27, 1968

[21] Appl. No.: 763,233

[52] U.S. Cl............346/1, 340/15.5 TG, 346/33 C
[51] Int. Cl............................G01d 9/42, G01v 1/24
[58] Field of Search........346/1, 33; 355/2; 340/15.5; 33/1

[56] References Cited

UNITED STATES PATENTS 3,185,994   5/1965   Woods et al...................346/1
3,187,336   6/1965   Montgomery............340/15.5

*Primary Examiner*—Richard B. Wilkinson
*Assistant Examiner*—Edith C. Simmons
*Attorney*—Robert G. Clay

[57] ABSTRACT

A time varying time scale display and the process for generating same, wherein conventional seismic data recorded at a fixed sampling rate are resampled at a preselected time varying rate. A conventional display camera is modified to provide an external timing circuit, which during the process is actuated by a timing signal based on the preselected time varying rate. Thus the high frequency portion of the display is expanded and the low frequency portion is contracted, to provide an improved seismic display having the selected time varying time scale.

4 Claims, 6 Drawing Figures

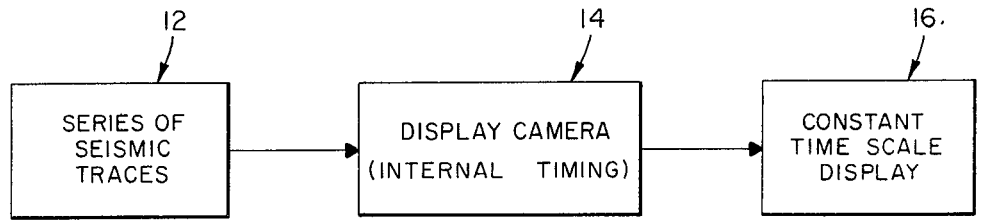
FIG_1    PRIOR ART PROCESS
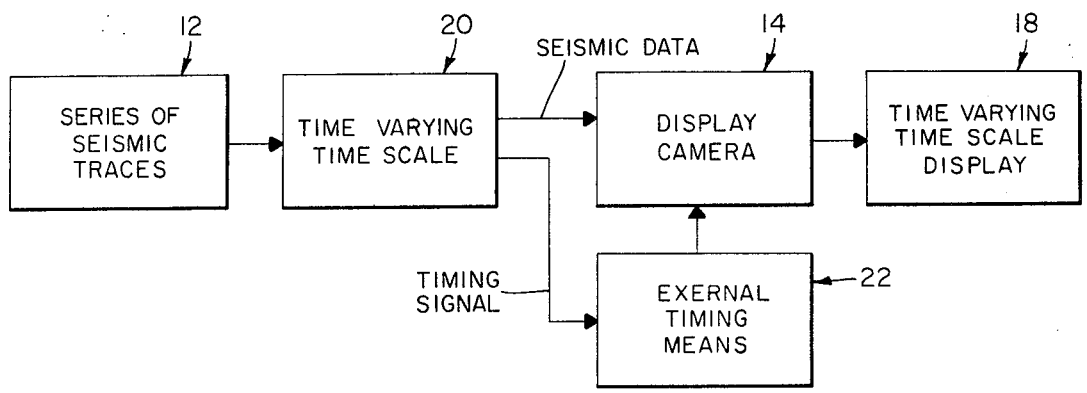
FIG_2    INVENTION PROCESS
INVENTOR.
JOHN K. WORLEY
BY Robert D. Clay
ATTORNEY

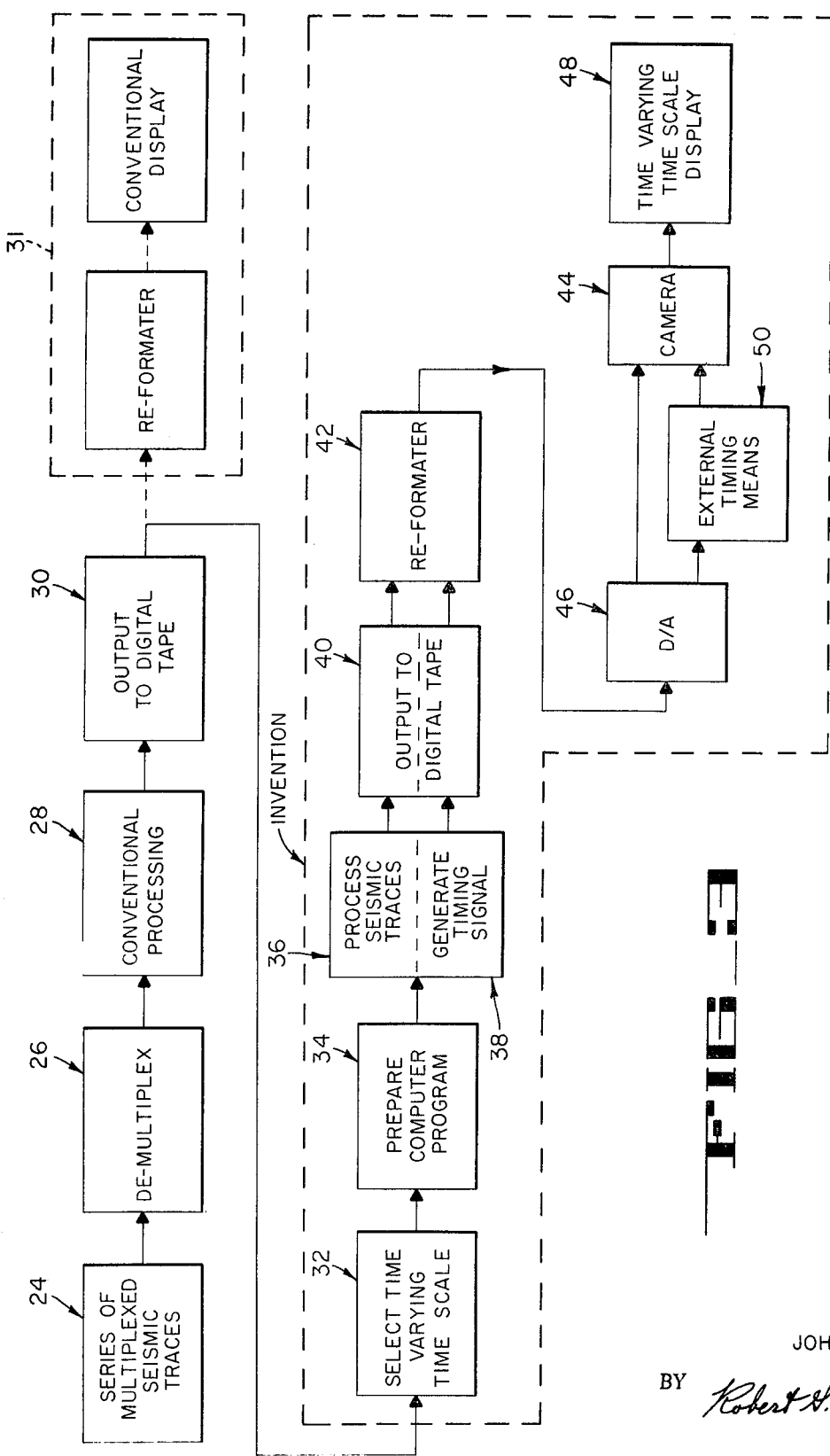

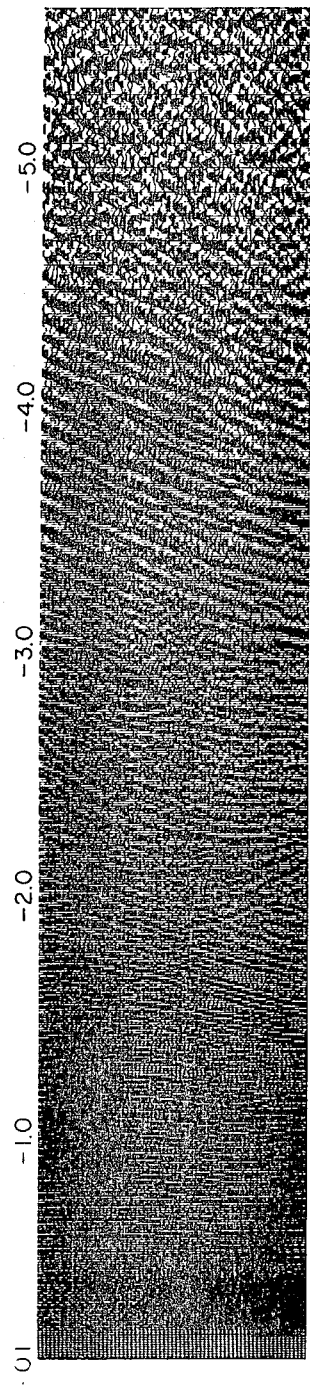
FIG_4 PRIOR ART
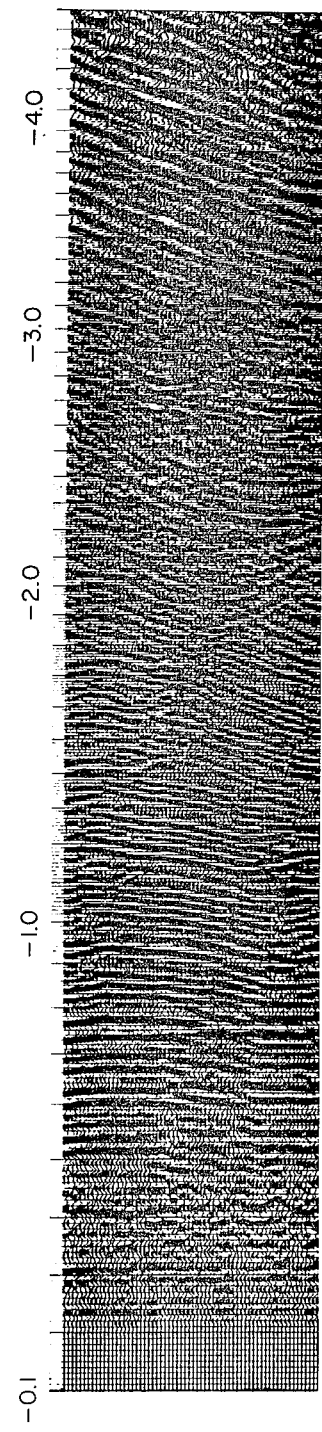
FIG_5 INVENTION
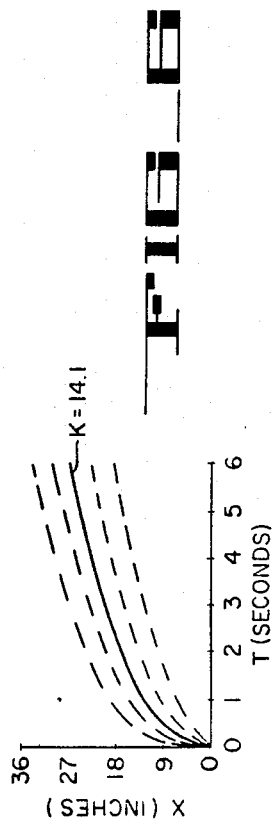
FIG_6
INVENTOR.
JOHN K. WORLEY
BY
*Robert H. Clay*
ATTORNEY

SEISMIC DATA TIME VARYING TIME SCALE DISPLAY AND PROCESS

BACKGROUND OF THE INVENTION

1. Field of the Invention

The present invention is related generally to seismic record section generation, and the resulting display and more particularly, to a display having a time varying time scale presentation and to the process for obtaining such display.

2. Description of the Prior Art

It is a well known fact that the breadth of a seismic wavelet increases with propagation time. Therefore, in prior art seismic display systems the early portion of a conventional seismogram appears to have closely spaced (high frequency) reflecting events and the later portion shows widely spaced (low frequency) events. In such prior art systems, the seismograms are photographed on a conventional display oscillograph or camera that has several non-time varying electrical filters. The filters are used to improve the signal-to-noise ratio of the data. However, the passband of the filter used must be wide enough to include the highest and lowest signal frequencies in the data. It follows that the use of such a wide passband allows additional undesirable noise to appear in the seismogram.

When the conventional seismogram is interpreted it is generally difficult to distinguish, and thus resolve, the closely spaced early reflecting events, whereas the later events are overly spaced and thus tend to spread otherwise readily distinguishable continuous events. The optical effect of the frequency variation in prior art seismic data displays having constant time scale presentations, is such that the lower frequency events appear to have a disproportionately larger amplitude than the high frequency events.

SUMMARY OF THE INVENTION

The present invention overcomes the shortcomings of prior art display systems, by providing a process and a resulting display, whereby the time scale utilized in displaying the seismic data is selectively varied in time to expand the early portion (high frequency) events and to contract the later portion (low frequency) events. The time varying time rate selected may be either linear or non-linear, wherein several constants of proportionality may be chosen. A timing signal equal to the time scale is generated by the process and is introduced to the display camera along with the converted seismic data. An external timing system is provided in the display camera and is actuated by the timing signal, to thus provide the display with a varying time scale in the form of timing lines whose spacing varies at the selected time varying rate.

BRIEF DESCRIPTION OF THE DRAWINGS

FIGS. 1 and 2 are simplified block diagrams which pictorially depict the prior art and the invention processes, respectively.

FIG. 3 is a more detailed block diagram depicting the invention process.

FIGS. 4 and 5 are photographs of actual displays of the prior art and the invention processes, respectively.

FIG. 6 is a graph showing a family of curves of the distance $x$ along the display versus the true time T of the data sample.

DESCRIPTION OF THE PREFERRED EMBODIMENTS

Referring to FIG. 1, as known in prior art systems, a conventionally obtained series of seismic traces 12, representing reflected seismic information, are introduced to a conventional recording oscillograph or camera 14. The series of seismic traces 12 may, or may not, be processed for the usual static and dynamic corrections. The camera 14 is provided with an internal timing circuit (not shown) which triggers a strobe light (not shown) to thereby expose a series of timing lines transverse to the length of the traces to form a seismic record section or display 16 as recorded by the camera 14. In such prior art systems, a constant time scale is utilized, whereby accordingly, the seismic data is displayed with a constant time scale; i.e., the timing lines have a constant spacing along the length of the seismic record section. It follows then, that the higher frequency reflecting events which appear and are recorded during the early portion of the display are closely spaced, while the lower frequency reflecting events which appear and are recorded during the last portion of the display are spread apart. The optical effect of the frequency variation is such that the lower frequency events appear to have a disproportionately larger amplitude than the higher frequency events, as may be seen from the prior art display 16 shown in detail in FIG. 4.

Referring to FIG. 2, the invention process provides an improved seismic display 18, by applying a selected time varying time scale as at 20 to the series of seismic traces 12, ie., to the reflected seismic information to thereby compensate for the frequency variation in the reflected seismic information. It is to be understood, that the word "scale" is employed herein as a general term defining the overall spaced series of timing lines which form the display; ie., "scale" is synonymous with "timing line spacing." In accordance with the invention, the scale is varied in a linear or a non-linear mode, ie., the timing line spacing is continuously changing along the length of the display or section in a linear or non-linear manner. A timing signal, commensurate with the selected time varying time scale applied to the data, is used to trigger an external timing means 22, whereby the display 18 presents the recorded seismic data and the timing lines in the selected time varying time scale. As may be seen from a comparison between the displays 16 and 18 of FIGS. 4 and 5 respectively, the effect is similar to stretching or expanding the earlier portion of the display, and contracting or compressing the later portion of the display. Thus a further advantage of the invention is the use of a narrow band camera filter rather than the wide band filter used by prior art systems. The narrow band filter becomes effectively a time varying filter.

Referring to FIG. 3, in more detail, a series of multiplexed seismic traces 24 are first de-multiplexed as at 26, and are conventionally processed as at 28 for static and dynamic corrections, move-out, etc. The processed traces are then outputed, preferably on digital tape as depicted at 30. As shown in phantom line as at 31, prior art systems feed the output from the digital tape 30 to a re-format device, and then presents the seismic record section as a constant time scale display, such as that of FIG. 4.

In accordance with the invention, however, the digital output tape 30 is operated upon by a selected time varying time scale before the display is recorded. To this end, a suitable time scale is chosen as at 32, which scale may be a linear or a non-linear changing scale, and may comprise one of various constants of proportionality. By way of example only, a preferred non-linear time scale is inversely proportional to the square root of the propagation time, and a linear time scale is inversely proportional to the time. Upon selection of the desired time varying time scale, a program is prepared as at 34 and is used on the stored seismic data as indicated at 36, to thereby resample the data at a sampling rate proportional to the selected time varying time scale. That is, a computer program is prepared, and placed for example on punched cards, to provide instructions to the computer as conventionally done in the art. During the step indicated by numeral 36, the output from the digital tape is placed in core and is manipulated as instructed in part by the program prepared in 34. The processed information is then recorded back on digital tape as indicated at 40. Since this process is well known in the computer art, it is not discussed further herein. A timing signal is generated during the manipulation process as further indicated at 38, wherein for example, 24 output channels carry the seismic data and one output channel carries the timing signal. The seismic data and the timing signal are outputed to digital tape as at 40 and are remultiplexed or re-formatted as at 42. Then the information is fed to a camera 44 via a digital-to-analog converter 46 to record a time varying display 48 in accordance with the invention. The generated timing signal is fed to an external timing means 50 via the digital-to-analog converter 46, wherein the timing signal triggers the timing line generator (not shown) in the camera 44 to draw the timing lines on the display in the selected time varying time scale, ie., in the selected linearly, or non-linearly, changing time line spacing. Note the seismic data is not shifted with regards to its original position relative to time as first presented in the seismogram.

In further explanation of the invention concept, if 36 inches is given as the usable length of a seismic record section, ie., a display, the invention process proposes that the information be relocated sample-by-sample, by calculating where the samples should be relocated on the display if a selected, time varying time line spacing is used in place of the constant time line spacing. With a given camera speed there may be, for example, 3600 data samples along the display length which, in a constant time line spacing, indicates that a sample occurs every 0.01 inch. Since the invention time varying scale causes an expansion of the information, the process interpolates between the sample times to provide an averaged sample or samples therebetween every 0.01 inch on the invention display. Accordingly, the computer program 34 consists of a set of instructions compatible to the computer, which instructs the computer to relocate the samples in accordance with the selected time varying time scale and interpolate for values therebetween, while maintaining the seismic data in its original position relative to time.

Accordingly, the process follows the relationship $$y = k \cdot T^b$$

where $y$ is the distance along the display, $k$ is a constant (viz., the constant of proportionality of previous mention), $T$ is the true time of the data sample, $b$ is the power defining the time varying time scale.

By way of example only, wherein $k=14.1$, $b=\frac{1}{2}$ is selected as the (non-linear) time varying time scale, the above relationship is expressed as $y = 14.1 \cdot T^{1/2}$ As shown in FIG. 6, the relationship may be expressed as a family of curves, wherein different values of $k$ correspond to the various curves. As shown on the graph, in accordance with the invention, the timing line spacings may be determined by dividing $T$ into, for example, 0.01 inch spacings, where depending upon the selected value of $k$, a new position $y$ of the data samples is found for the time varying time scale display. Table 1 shown hereinbelow is a list of the calculated positions of the data samples with respect to time in seconds, for several sequences 1 through 12. Thus sequence number 6 (which is the most commonly used) shows that at 1 second the sample point is at 14.1 inches along the display, at 2 seconds the sample point is at 20.0 inches, at 4 seconds it is at 28.2 inches, ... etc.

TABLE 1

TIME SCALE NUMBER

| Approx. Length of Section in Inches: | 1 | 2 | 3 | 4 | 5 | 6 |
|---|---|---|---|---|---|---|
| at 1.0 Sec | 9.1 | 10.0 | 10.9 | 11.9 | 13.0 | 14.1 |
| at 2.0 Sec | 13.0 | 14.1 | 15.4 | 16.8 | 18.3 | 20.0 |
| at 4.0 Sec | 18.2 | 20.0 | 21.8 | 23.8 | 26.0 | 28.2 |
| at 6.0 Sec | 22.5 | 24.5 | 26.8 | 29.1 | 31.8 | 34.6 |

| | 7 | 8 | 9 | 10 | 11 | 12 |
|---|---|---|---|---|---|---|
| at 1.0 Sec | 15.4 | 16.8 | 18.3 | 20.0 | 21.8 | 23.8 |
| at 2.0 Sec | 21.8 | 23.8 | 25.9 | 28.3 | 30.9 | 32.6 |
| at 4.0 Sec | 30.8 | 33.6 | 36.6 | — | — | — |
| at 6.0 Sec | — | — | — | — | — | — |

The concept of the invention may be further described with reference to mechanical apparatus which may be employed to effect the time varying time scale display presentation. Thus if the display is recorded in an oscillograph camera utilizing a display sheet wrapped about the periphery of a cylindrical drum as is conventionally done, it may be seen that the time varying time scale could theoretically be displayed on the sheet by varying the speed of the drum in accordance with the time scale chosen. However, due to drum inertia, etc, it is practically impossible to control the rotation of the drum with the precise changes in speed required. However, since in actuality it is the recording head-to-drum speed which determines the time scale, it is possible to vary the time scale in accordance with the invention by varying the position of the recording heads relative to the recording surface, ie., the drum, rotation. Thus, the recording heads employed to record the display may be mounted so as to translate about the circumference of the drum. A drive member is coupled to each head and also to either a pre-cut cam member or an electrical servo device, whereby translation of the heads may be effected about the circumference of the drum. Thus in providing a time varying time scale in accordance with the invention, upon initiation of a display recording process a large relative velocity between the heads and drum is employed, which velocity is gradually decreased as per the selected time scale as the drum rotates through a single rotation.

1. A process for displaying seismic traces in side-by-side format in a camera, to define a seismic record section of selected length, comprising the steps of:

applying a selected time varying time scale to the seismic traces prior to recording the section; and recording the seismic traces in the camera with the same time varying time scale to define the seismic record section of selected length.

2. The process of claim 1 wherein the step of applying further comprises, calculating the location of data samples of said traces in accordance with the selected time varying time scale, shifting the data samples to their calculated location to provide samples with the time varying time scale, and temporarily storing the shifted data samples for subsequent use in the recording step.

3. The process of claim 2 wherein the step of recording further comprises, generating a timing line signal with said selected time varying time scale, introducing the timing line signal along with said shifted data samples to the camera to provide time varying time lines for displaying the shifted data samples thereon in the form of traces shifted in accordance with the selected time varying time scale.

4. The process of claim 3 wherein the selected time varying time scale is represented by the relationship $y = k \cdot T^b$, where $y$ is the distance along the display, $k$ is a constant, $T$ is the true time of the data samples, and $b$ is the power defining the time varying time rate.

* * * * *